US006287246B1

(12) United States Patent
Yoshii et al.

(10) Patent No.: US 6,287,246 B1
(45) Date of Patent: Sep. 11, 2001

(54) DEVELOPMENT ROLLER

(75) Inventors: Takayuki Yoshii, Kanagawa; Kyoichi Ashikawa, Tokyo; Taisuke Tokuwaki, Kanagawa; Makoto Nakamura, Kanagawa; Yoshiyuki Takano, Kanagawa; Atsushi Ohta, Kanagawa; Noriyuki Kamiya, Kanagawa, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/377,915

(22) Filed: Aug. 20, 1999

(30) Foreign Application Priority Data

Aug. 21, 1998 (JP) .......... 10-235188
Jan. 14, 1999 (JP) .......... 11-007351
Mar. 25, 1999 (JP) .......... 11-081324
Jun. 9, 1999 (JP) .......... 11-162764

(51) Int. Cl.⁷ .......... F16C 13/00
(52) U.S. Cl. .......... 492/59; 492/56
(58) Field of Search .......... 492/56, 59; 428/500; 399/265, 279, 276; 430/124, 126

(56) References Cited

U.S. PATENT DOCUMENTS 4,582,894 * 4/1986 Pfohl .......... 528/250
5,244,741 9/1993 Nagano et al. .
5,302,438 * 4/1994 Komamura et al. .......... 428/500
5,322,832 * 6/1994 Takeyama et al. .......... 503/227
5,456,782 10/1995 Fujita et al. .
5,543,902 8/1996 Takeda et al. .
5,783,288 7/1998 Fujita et al. .
5,851,719 * 12/1998 Takei et al. .......... 430/126
5,869,184 * 2/1999 Oishi et al. .......... 428/402.24
5,908,723 * 6/1999 Malhotra et al. .......... 428/500
5,970,294 10/1999 Narita et al. .

FOREIGN PATENT DOCUMENTS

161234 * 11/1985 (EP) .
09230690 9/1997 (JP) .
09230691 9/1997 (JP) .
09269652 10/1997 (JP) .
2801724 7/1998 (JP) .
12-147899A * 5/2000 (JP) .
12-56539A * 5/2000 (JP) .

OTHER PUBLICATIONS

Abstract of Germany Patent DE3586256G, Jul. 1992.*
Abstract of Japanese Patent JP02308872A, May 1989.*
Chemical Abstract of 3–249675.

* cited by examiner

*Primary Examiner*—I Cuda Rosenbaum
*Assistant Examiner*—Trinh Nguyen
(74) *Attorney, Agent, or Firm*—Oblon, Spivak, McClelland, Maier & Neustadt, P.C.

(57) ABSTRACT

A development roller for developing a latent electrostatic image to a visible toner image with toner, including a surface layer which contains a guanamine-skeleton-containing compound.

18 Claims, 2 Drawing Sheets

DEVELOPMENT ROLLER

BACKGROUND OF THE INVENTION

1. Field of the Invention

The present invention relates to a development roller for use in an image formation apparatus such as an electrophotographic copying machine, a printer and a facsimile apparatus.

2. Discussion of Background

In recent years, in the field of electrophotographic image formation apparatus such as copying machines, printers and facsimile apparatus, in particular, in the field of small size electrophotographic image formation apparatus, the maintenance thereof is being significantly simplified. An electrophotographic image formation apparatus, using a dry type mono-component toner, is used in practice as a low cost apparatus due to its small size and easy maintenance.

In such an electrophotographic image formation apparatus, a latent electrostatic image is formed on a surface of a photoconductor drum serving as a latent-electrostatic-image bearing member, and a charged toner is supplied onto the surface of the photoconductor drum, with a concentration of the toner being maintained constant, by a development roller which serves as a toner carrying member. With the toner being brought into contact with the photoconductor drum or being placed near the photoconductor drum, the latent electrostatic image formed on the surface of the photoconductor drum is developed with the toner to a visible toner image. The thus developed visible toner image is then transferred to an appropriate image transfer sheet such as a recording paper, and then fixed thereto, for instance, with the application of heat and pressure thereto, in an image fixing process. Thus, the toner image is recorded on the image transfer sheet and then output.

As such a development roller, various types of development rollers have been proposed, for example, those including an elastic layer composed of an elastic material such as a rubber or an elastomer. In order to prevent the photoconductor from being contaminated by a plasticizer and a low-molecular-weight component released from a rubber or urethane foam used in the elastic layer due to the bleeding thereof from the elastic layer, and also in order to prevent the tacking or filming of toner, the elastic layer is generally covered with a surface layer made of a resin with excellent toner releasability which is capable of preventing the bleeding of the plasticizer and the low-molecular-weight component from the elastic layer onto the surface of the photoconductor.

For example, in Japanese Laid-Open Patent Application 53-3233, there is proposed a method of developing a latent electrostatic image to a visible image, in which an elastic latent-electrostatic-image-bearing member which bears thereon a latent electrostatic image and an elastic development roller are brought into pressure contact with each other at a development position, and the latent electrostatic image on the latent-electrostatic-image-bearing member is developed to a visible image while the pressure between the latent-electrostatic-image-bearing member and the elastic development roller is being absorbed by the elasticity of each of the latent-electrostatic-image-bearing member and the elastic development roller. In this latent electrostatic image development method, in order to bring the development roller into contact with a photoconductor drum, the development roller is composed of a shaft made of a metal and a conducting rubber with about 40HS which is caused to adhere to a peripheral surface of the shaft.

In this latent electrostatic image development method, when the development roller which bears thereon a thin layer of toner is brought into contact with a latent electrostatic image formed on the photoconductor drum, the thin layer of toner is transferred from the surface of the development roller to the surface of the photoconductor in accordance with an electric field for development formed between the photoconductor drum and the development roller, so that the latent electrostatic image formed on the photoconductor drum is developed to a visible toner image. This latent electrostatic image development method has an advantage over other development methods that a colored image can be easily formed by using a mono-component non-magnetic toner, without using any magnetic material in the toner.

Furthermore, a dielectric layer containing an electric resistivity adjustment agent such as carbon is generally provided on the surface of such an elastic development roller. For example, in Japanese Laid-Open Patent Application 10-115979, there are disclosed a method of decreasing the abrasion of a surface of a development roller, and a method of adjusting an electrostatic capacity or an electric resistivity of the development roller, by coating a surface of a conducting elastic layer with a resin component which is different from a resin component used in the conducting elastic layer. As a resin component for use in a surface layer provided on the conducting elastic layer, a resin which does not contaminate a latent electrostatic image bearing member such as a photoconductor drum is selectively used. Examples of such resins are urea resin, melamine resin, alkyd resin, modified alkyd resins such as phenol-modified alkyd resin and silicone-modified alkyd resin, acrylic resin, silicone resin, fluororesin, phenolic resin, polyamide resin, epoxy resin, polyester resin, maleic acid resin, and urethane resin. It is also disclosed that one or more resins selected from the group consisting of urea resin, melamine resin and acrylic resin are preferable resins from the veiwpoints of film formation properties and close contact properties. It is also stated that these resin components may contain a conducting material such as carbon black.

However, the development roller disclosed in the above prior art references has a shortcoming that the quantity of charge with which toner is charged by the development roller is low, so that when the charged toner contains many toner particles charged with an opposite polarity, such oppositely charged toner particles are deposited on the background of latent electrostatic images, and output images formed on a transfer sheet are such images that toner particles are deposited on the background of the images. This phenomenon is referred to as the fogging of background.

When the charge quantity of the toner is low, and its charging rise-up rate is low, the stability of image density is poor, for instance, with the formation of a difference in image density between a leading end portion and a rear end portion of an image transfer sheet, or the formation of ghost images.

Furthermore, under high temperature and high humidity conditions, the charge quantity of toner is apt to be lowered, and the fogging of the background of image is also apt to take place in output images on the image transfer sheet. Thus, the image density tends to become unstable.

Even when such problems do not occur at an initial stage in the use of the development roller, the above-mentioned problems may eventually occur during extended continuous use thereof, resulting in that the development roller has too poor a durability to be used in practice.

For example, it may occur that toner is deposited in the form of a film on the surface of the development roller as the number of copies made is increased in the course of making copies. This is caused by a mono-component toner for use in a mono-component contact development system being melted with a slight amount of heat applied thereto. More specifically, the surface layer of the development roller which bears thereon the mono-component toner is strongly brought into contact with other members, such as the photoconductor and a toner sealing member, so that the mono-component toner is melted with frictional heat generated by the strong contact of the surface layer of the development roller with the other members, and pressed hard to be fixed to the surface layer of the development roller with time. This fixing phenomenon is called "toner filming". The toner filming which takes place on the surface layer of the development roller lowers the charge quantity of toner, and causes much fogging of the background of output images, with the deposition of toner on the background of the images, making it difficult to obtain images with sufficient image density for use in practice.

The surface layer of the development roller is rotated in pressure contact with the photoconductor or a toner sealing member, so that there may occur a problem that the surface layer of the development roller is cracked during the use thereof for an extended period of time. Such cracking in the surface layer of the development roller appears in the form of an image defect in output images, so that it is required that the surface layer have such a flexibility that can sufficiently follow up a deformation of a depressed elastic layer.

Recently from the viewpoint of environmental problems, and also from the viewpoint of energy saving, the lowering of image fixing temperature has been studied. Under such circumstances, there is a tendency that the melting point of toner is lowered, so that there is less room for preventing the occurrence of the toner filming on the surface of the development roller.

Furthermore, recently the following are preferred: a development roller which is constructed in the form of a single unit so as to be detachable from an image formation apparatus; and a development unit, that is, a toner unit, in which the development roller is incorporated together with a charging member for applying charges to toner in a case for holding toner therein, and an image formation process unit, which is referred to as a process unit or a process cartridge, in which the development roller is integrated with a latent electrostatic image bearing member such as a drum-shaped photoconductor, which development unit and image formation process unit are constructed so as to be detachable from the image formation apparatus. Thus, by uniting a plurality of image formation members including the development roller for the image formation apparatus into a single unit, and incorporating the unit into the image formation apparatus, the maintenance of the unit including the image formation members can be simplified. In this case, even when one of the image formation members in the unit is found to be defective in the performance thereof, the unit can be replaced in its entirety with a perfect unit. Therefore, it is an extremely important target to be aimed at that the development roller used as a unit member in the above-mentioned unit has a sufficient high durability for continuous use for an extended period of time.

From the above-mentioned point of view, it is very important that the surface layer of the development roller is capable of applying charges to toner in a stable manner in continuous use for an extended period of time regardless of changes in the ambient conditions thereunder.

SUMMARY OF THE INVENTION

It is therefore an object of the present invention to provide a development roller including a surface layer, which is capable of applying charges to toner in a stable manner even when used continuously for an extended period of time, and accordingly which is capable of forming images free of toner deposition on the background of images, which is hereinafter referred to as the fogging of the background of image, without causing any reduction in image density, the surface layer being capable of retaining high durability in a stable manner, without forming any cracks therein, and with minimized formation of the filing of toner on the surface of the development roller, even when used for and extended period of time.

The object of the present invention can be achieved by a development roller for developing a latent electrostatic image to a visible toner image with toner, comprising a surface layer which comprises a guanamine-skeleton-containing compound.

More specifically, the development roller constructed in this manner is capable of applying charges to toner in a stable manner even when used continuously for an extended period of time under high temperature and high humidity conditions, and accordingly is capable of forming images free of the fogging of the background of image, without causing any reduction in image density and forming cracks in the surface layer, with stable operational durability over an extended period of time.

In the above development roller, the guanamine skeleton of the guanamine-skeleton-containing compound may be derived from a compound selected the group consisting of guanamine, a guanamine derivative and a guanamine-skeleton-containing condensation compound, which are commercially available without difficulty.

It is preferable that the guanamine-skeleton-containing compound be a condensation cross-linked compound. When a condensation cross-linked compound is used as the guanamine-skeleton-containing compound, by appropriate selection of a counterpart compound to be reacted with a compound from which the guanamine skeleton is derived, such as guanamine, a guanamine derivative and a guanamine-skeleton-containing condensation compound as mentioned above, there can be obtained various effects selectively or in a particular manner, such as the attainment of close contact of the surface layer with an elastic layer when the elastic layer is provided under the surface layer, the prevention of the formation of cracks in the surface layer, and the prevention of the contamination of a photoconductor with the development roller, when the development roller is allowed to stand in contact with the photoconductor. The above-mentioned compound from which the guanamine skeleton is derived, such as guanamine, a guanamine derivative and a guanamine-skeleton-containing condensation compound, is hereinafter referred to as the guanamine-skeleton-deriving compound.

The guanamine-skeleton-deriving compound can be used by allowing it to react with various compounds having various functions to produce various condensation cross-linked compounds.

For instance, a condensation cross-linked compound can be prepared from (1) a polymer or prepolymer having a plurality of hydroxyl groups in a main chain or a side chain of the polymer or repolymer, and (2) at least one of the above-mentioned guanamine-skeleton-deriving compounds such as guanamine, a guanamine derivative, and a guanamine-skeleton-containing condensation compound.

When the above prepared condensation cross-linked compound is used in the surface layer, the development roller is capable of applying a sufficient quantity of charges to toner even when used under high temperature and high humidity conditions, or continuously used for an extended period of time, and accordingly is capable of forming images free of the fogging of the background of image, with an improved image quality with a stable image density, with the prevention of the contamination of a photoconductor with the development roller when the development roller is allowed to stand in contact with the photoconductor, with the prevention of the tacking of toner, with the attainment of close contact of the surface layer with the elastic layer provided under the surface layer, and with the prevention of the formation of cracks in the surface layer, thus securing high durability of the development roller even when used for an extended period of time.

Another condensation cross-linked compound to be used as the guanamine-skeleton-containing compound for use in the above development roller of the present invention can be prepared by a condensation cross-linking reaction between a fluorine-contained polymer and at least one of the above-mentioned guanamine-skeleton-deriving compounds such as guanamine, a guanamine derivative, and a guanamine-skeleton-containing condensation compound. By use of the fluorine-contained polymer or copolymer, which has excellent resistance to chemicals and high flexibility with high bending strength, such properties can be imparted to the surface layer, and the condensation cross-linked compound thus produced imparts lubricity to the surface layer so as to reduce a coefficient of friction of the surface layer, whereby the filming of toner on the development roller can be avoided.

Furthermore, due to the high flexibility imparted to the surface layer, even when the surface layer of the development roller is depressed by the photoconductor or a toner supply roller, cracks are difficult to be formed in the surface layer.

The development roller, which is a rotating member, is sealed by a sealing member in order to prevent toner from flowing out therefrom. When the above-mentioned condensation cross-linked compound prepared using the fluorine-contained polymer is used, high lubricity is imparted to the surface layer, so that even when the sealing member depresses the surface of the development roller, the rotation torque of the development roller can be reduced, and even if toner enters between the sealing member and the development roller, the friction between the sealing member and the development roller can be reduced and it is expected that the development roller will have an improved durability from this point of view.

Furthermore, since the fluorine-contained polymer or copolymer is used in the form of a condensation cross-linked product, the development roller is capable of applying a sufficient quantity of charges to toner even when used under high temperature and high humidity conditions, or continuously used for an extended period of time, and accordingly is capable of forming images free of the fogging of the background of image.

Preferable examples of the guanamine derivative are benzoguanamine and acetoguanamine which are commercially available without difficulty.

As mentioned above, the surface layer can be provided on an elastic layer, whereby a mono-component non-magnetic toner, without using a magnetic material in the toner, can be employed, so that the development roller can be used in an image formation method for producing color images.

In the development roller including the elastic layer, it is preferable that the elastic layer have a volume resistivity smaller than that of the surface layer. This is because in the above development roller, even when there is non-uniformity in the electric resistivity in the elastic layer, the non-uniformity in the electric resistivity in the elastic layer can be reduced by the presence of the surface layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
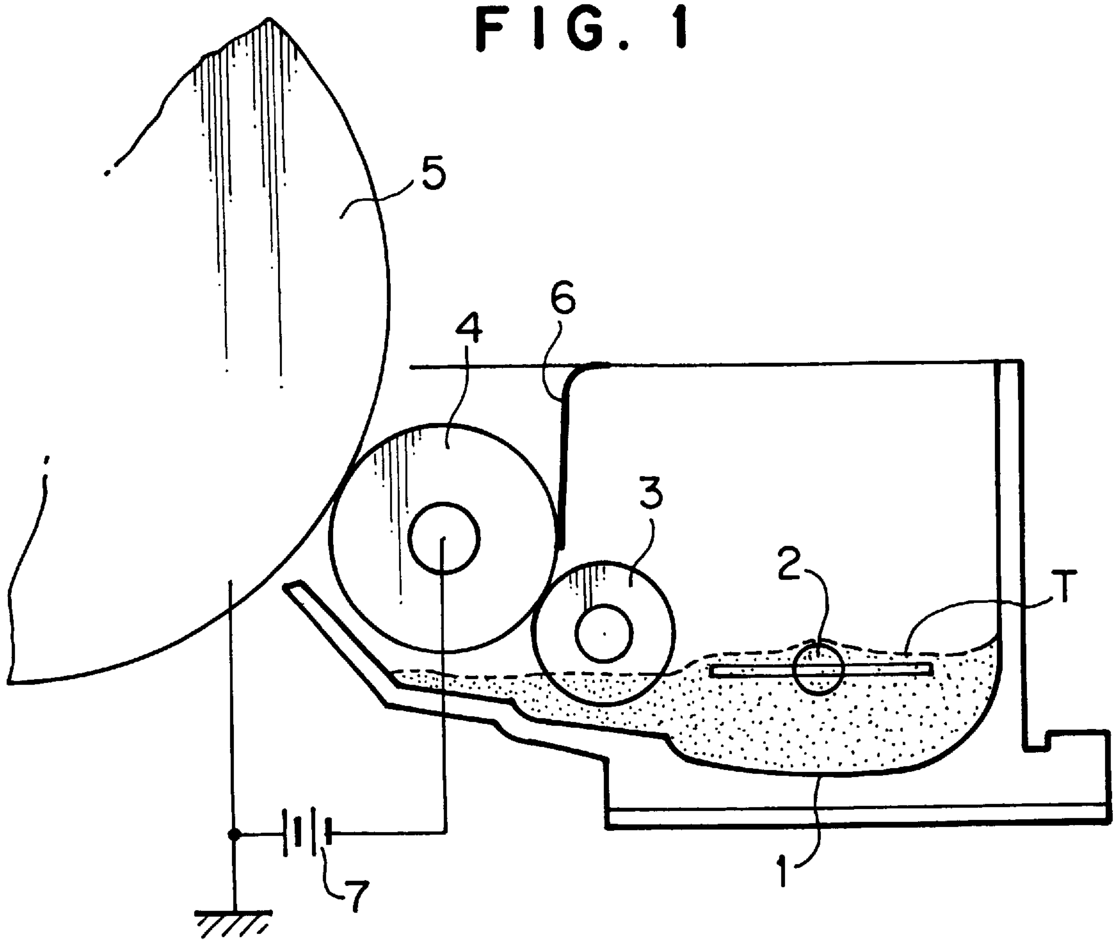
FIG. 1 is a schematic cross-sectional view showing a main portion of an image formation apparatus provided with a development roller of the present invention.

FIG. 1 shows a main portion of an image formation apparatus provided with a development apparatus in which the development roller of the present invention is used. Reference numeral 1 indicates a toner tank for holding toner T therein. On side plates (not shown) of the toner tank 1, there are pivotally supported a roller agitator 2 serving as a toner transporting member, a toner supply roller 3 comprising a shaft and a sponge layer provided around the shaft, for transporting and supplying the toner, and a development roller 4 serving as a toner bearing member. The development roller 4 is rotatably disposed at an opening portion of the toner tank 1. A photoconductor drum (or a belt-shaped photoconductor) 5, serving as a latent electrostatic image bearing member, is disposed in parallel with the development roller 4, in contact with an exposed surface of the development roller 4. Within the toner tank 1, there is fixed an elastic blade 6 serving as a toner layer formation member, which is in elastic pressure contact with the development roller 4.

This development apparatus is constructed in such a manner that across the photoconductor drum 5 and the development roller 4, there is applied, for instance, through a plate spring electrode, a bias voltage 7 with such a potential that is approximately in the middle between a potential of the photoconductor drum 5 after being charged and a residual potential of the photoconductor drum 5 after being exposed to light, that is, after optical writing.

In this development apparatus, the toner T supplied to the toner tank 1 is stirred with the agitator 2 so as to be filled in a space around the supply roller 3. The toner T is triboelectrically charged by the rotation of the toner supply roller 3 and the development roller 4, and then adsorbed on the surface of the development roller 4 due to a difference in potential between the development roller 4 and the toner supply roller 3. The thus adsorbed toner is regulated so as to be in a predetermined amount with a constant concentration by the elastic blade 6 which is placed in contact with the surface of the development roller 4. When this elastic blade 6 is a triboelectric charging blade, the toner is further triboelectrically charged by this elastic blade at a contact portion of the elastic blade with the toner.

When the toner T is transported into a pressure contact portion between the development roller 4 and the photoconductor drum 5, the toner T is deposited imagewise on the surface of the photoconductor drum 5 so as to correspond to a latent electrostatic image with a pattern-shaped surface potential formed on the surface of the photoconductor drum 5, whereby the latent electrostatic image is developed to a visible toner image.

In this image formation apparatus, the toner tank 1, the agitator 2, the supply roller 3, the development roller 4 and the elastic blade 6 may be united to a development unit in such a manner that the development unit can be incorporated into the image formation apparatus so as to be detachable from the image formation apparatus.

The development roller 4 is composed of a cylindrical metal core shaft 41, an elastic layer 42 made of a rubber or an elastomer provided so as to cover the peripheral surface of the cylindrical metal core shaft 41, and a surface layer 43 provided so as to cover the elastic layer 42.

Examples of elastic materials for forming the elastic layer 42 are polyurethane, ethylene propylene diene copolymer (EPDM), and rubbers such as natural rubber, butyl rubber, nitrile rubber, ethylene-propylene rubber, butadiene rubber, styrene rubber, isoprene rubber, silicone rubber, styrene-butadiene rubber, chloroprene rubber, acrylic rubber and urethane rubber, and elastomers thereof. These elastic materials may be used alone or in combination.

In order to convert the above elastic materials into rubber-like materials by cross-linking, a cross-linking agent or a vulcanizing agent may be added thereto. In this case, varieties of ingredients for controlling the cross-linking reaction, such as a vulcanizing auxiliary agent, a vulcanizing accelerator and a vulcanizing retarder can be employed either in organic peroxide cross-linking or in sulfur cross-linking. Other ingredients that are in general use in elastic materials such as rubber materials may also be added to the above-mentioned elastic layer. Examples of such ingredients are a foaming agent, a plasticizer, a softener, a tackifier, a surface tack eliminator, a separating agent, a releasing agent, a bulk filler, a coloring agent, and an aging preventing agent.

It is important that the development roller has particular electric characteristics, in particular, a specific electric resistivity. In the present invention, it is preferable that the elastic layer 42 have a volume resistivity in a range of $10^4\Omega\cdot cm$ to $10^6\Omega\cdot cm$. When the volume resistivity is less than $10^4\Omega\cdot cm$, electric leakage to the photoconductor takes place, so that there is a risk that the photoconductor and the development roller are broken. On the other hand, when the volume resistivity is more than $10^6\Omega\cdot cm$, the fogging of the background of image is apt to take place.

The resistivity of the elastic layer 42 can be adjusted by adding thereto an electrical-conductivity-imparting agent (hereinafter referred to as electro-conductive materials). There is no particular restriction to such electroconductive materials. For instance, electroconductive particles or powder, and ionic conducting materials can be employed.

Examples of electroconductive materials in the form of powder are conducting carbons, such as ketjen black EC and acetylene black, carbon blacks for rubber (hard carbon and soft carbon), such as SAF, ISAF, HAF, FEF, GPF, SRF, FT and MT, carbon for color, which is subjected to oxidation treatment, and pryolitic carbon. Furthermore, metals and metal oxides such as copper, silver, germanium, indium doped tin oxide (ITO), tin oxide, titanium oxide and zinc oxide can also be employed as the electro-conductive materials. Furthermore, conducting polymers such as polyaniline, polypyrrole, and polyethylene can also be employed.

Examples of the ionic conducting materials are inorganic ionic conducting materials such as sodium perchlorate, potassium perchlorate and lithium chloride, and organic ionic conducting materials such as modified fatty acid dimethylammonium sulfate, ammonium acetate stearate, laurylammonium acetate, and octadecyltrimethylammonium perchlorate.

There is no particular limitation to the hardness of the elastic layer 42. However, when the development roller contacts with the photoconductor, it is preferable that the hardness of the elastic layer 42 be 70° or less, more preferably in a range of 20° to 60° in a JIS-A scale (Japanese Industrial Standards). When the hardness of the elastic layer 42 is excessively high and the photoconductor is a drum-shaped photoconductor, there is a risk that development cannot be carried out properly because a nip width of the development roller becomes too narrow to perform appropriate development. On the other hand, when the hardness of the elastic layer 42 is excessively low, a compression set of the elastic layer 42 becomes large, so that when the development roller is deformed or becomes eccentric, non-uniformity takes place in image density. When the elastic layer 42 is made of a material with low hardness, the quality of images obtained largely depend upon the physical properties of the material, so that the materials that can be employed are limited. Even when the hardness of the elastic layer 42 is lowered, it is preferable that the compression set be minimized, specifically at 20% or less.

In the present invention, the surface layer 43 comprises a guanamine-skeleton containing compound. The guanamine skeleton of the guanamine-skeleton containing compound can be derived from the guanamine-skeleton-deriving compound such as guanamine, a guanamine derivative of general formula (1), and a guanamine-skeleton-containing condensation product of polymer of general formula (2), for example, guanamine resin.

(1)

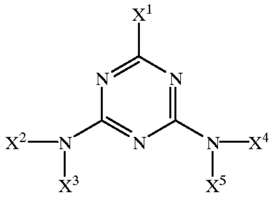

(2)

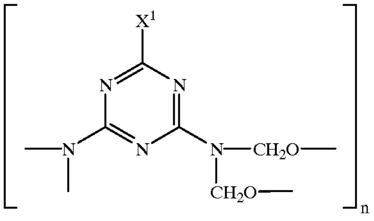

In general formulae (1) and (2), $X^1$ is a hydrogen atom, an aliphatic hydrocarbon group such as an alkyl group, for example, methyl group, or an aromatic hydrocarbon group such as a phenyl group, $X^2$, $X^3$, $X^4$, and $X^5$ are each independently a hydrogen atom, a lower alkanol group such as methylol group or butylol group, or an alkoxyalkyl group such as methoxymethyl group or butoxymethyl group. In general formula (2), n is an integer.

The above general formula (1) represents guanamine when $X^1$, $X^2$, $X^3$, $X^4$, and $X^5$ are all a hydrogen atom. The guanamine-skeleton-containing condensation product includes the condensation product represented by the above general formula (2) and also condensation reaction products or guanamine resin obtained by condensation of guanamine or its derivative through dehydration or dealcohol reaction. The guanamine resin includes, for example, acetoguanamine resin and benzoguanamine resin. Resins obtained by the reaction between guanamine or its derivatives (guanamines) and formaldehyde or the like are collectively referred to as guanamine resin.

The development roller including the surface layer 43 comprising the guanamine-skeleton-containing compound is capable of charging toner with a sufficient quantity of charges and providing improved image quality free of the fogging of the background of image, with high image density stability, even when used under high temperature and high humidity conditions for an extended period of time.

The guanamine-skeleton-containing compound can be used alone when the compound itself has a film formation property in forming the surface layer 43, but may also be used in the form of a dispersion in an appropriate resin (polymer or prepolymer) or in the form of a reaction product with an appropriate resin in forming the surface layer 43. Guanamine, its derivatives and the guanamine-skeleton-containing condensation product or polymer which are collectively referred to as the guanamine-skeleton-deriving compound, can be used in combination with other resin materials (organic polymer materials or polymers) or prepolymers, either with or without reaction therebetween.

It is required that the resin material for use in the development roller have properties of (1) being capable of charging toner, (2) being capable of depositing toner thereon, (3) being free of "toner filming", (4) having appropriate mechanical strength, (5) having appropriate workability, and (6) being capable of filling therein fillers such as a conducting filler, or uniformly dispersing such fillers.

In the present invention, with the above requirements taken into consideration, appropriate resin materials or prepolymers are selectively used. Generally, as a resin material for use in the surface layer 43 of the development roller, thermoplastic resin is used, but in the present invention, thermosetting resin may be used although thermoplastic resin is in general use.

When a condensation cross-linked compound is used as the guanamine-skeleton-containing compound, various effects can be obtained by appropriate selection of a material to be reacted with the guanamine-skeleton-deriving compound. For example, the close contact performance of the surface layer 43 with the elastic layer 42 can be improved, and the cracking of the surface layer 43 can be effectively prevented, and the contamination of the photoconductor with the development roller, which occurs when the photoconductor is allowed to stand in contact with the development roller, can also be effectively prevented.

For example, the guanamine-skeleton-deriving compound reacts with a polymer or prepolymer including a plurality of hydroxyl groups at a main chain or of a side chain thereof to produce a condensation cross-linked compound. When this condensation cross-linked compound is used in the surface layer 43, toner can be charged with a sufficient quantity of charges, and there can be obtained improved image quality free of the fogging of the background of image, with high stability of image density, even when used under high temperature and high humidity conditions for an extended period of time. Furthermore, the contamination of the photoconductor with the development roller while in contact with the development roller, and the tacking of toner can be prevented, so that the close contact of the surface layer 43 with the elastic layer 42 can be effectively attained, and the cracking of the surface layer 43 can be prevented even when used for an extended period of time, and high durability of the development roller can be secured.

The polymer or prepolymer having hydroxyl groups at a main chain or a side chain of the polymer or the prepolymer can be cross-linked with the guanamine-skeleton-deriving compound.

It is preferable that the polymer or prepolymer having hydroxyl groups at a main chain or of a side chain thereof have a hydroxyl value of 100 or less, and a glass transition temperature Tg of 60° or less. When the hydroxyl value of the polymer or prepolymer is more than 100, the surface layer 43 tends to become too hard to follow up the elasticity of the elastic layer 42 which is provided under the surface layer 43, so that the surface layer 42 is difficult to perform its function sufficiently. Furthermore, when the glass transition temperature Tg of the polymer or prepolymer is 60° or less, the flexibility of the surface layer 43 is so increased that the above-mentioned effect is enhanced.

Fluorine-contained polymer generally has excellent resistance to chemicals, high flexibility with strong bending strength, and good lubricating properties with a small coefficient of friction. By containing such a fluorine-contained polymer in the surface layer 43 of the development roller, the filming of toner on the surface of the development roller can be prevented. Furthermore, the fluorine-contained polymer imparts flexibility to the surface layer 43 of the development roller, so that the fluorine-contained polymer makes it difficult for the surface layer 43 to be cracked even when the photo-conductor or the supply roller is brought into pressure contact with the surface layer 43. The development roller which is rotated is sealed, using a sealing member, in order to prevent toner from leaking therefrom. When the surface of the development roller has excellent lubricating properties, even if the sealing member is brought into pressure contact with the surface of the development roller, the rotating torque of the development roller can be prevented from increasing, and even when toner enters between the sealing member and the development roller, the friction between the sealing member and the development roller can be reduced, and accordingly the durability of the development roller can be improved.

However, such a fluorine-contained polymer or fluororesin has a shortcoming that its toner charging performance is poor when used alone. The inventors of the present invention have discovered that when the fluororesin is used in the surface layer 43 which contains the guanamine-skeleton-containin compound in a composite form with the fluororesin, the preferable characteristics of the fluororesin can be best used, without decreasing the toner charging performance of the guanamine-skeleton-containing compound.

In this case, the fluororesin can be used either alone or in combination with a compound having a functional group with is reactive with the guanamine-skeleton-deriving compound to obtain a condensation cross-linked material having both the guanamine sekeleton and the fluororesin skeleton. When such a condensation cross-linked material is used in the surface layer 43, toner can be charged with a sufficient quantity of charges and improved image quality free of the fogging of the background of image can be obtained, even when used under high temperature and high humidity conditions for an extended period of time.

An example of such a fluorine-contained polymer having a functional group with cross-linking reactivity is a fluorine-contained copolymer such as fluoro-olefin vinyl ether copolymer. In the present invention, the example of the fluorine-contained polymer is not limited to the above, but fluorine-contained polymers or copolymers which are expected to have the above-mentioned effects due to the inclusion of fluorine therein, and are subjected to a cross-linking reaction with the guanamine-skeleton-deriving compound in the same manner as with hydroxyl groups.

In the present invention, there is no particular limitation to the content of the guanamine-skeleton moiety. However it is expected that sufficient effects can be obtained when the content thereof is 10 wt. % or more, preferably 20 wt. % or more, based on the starting materials, as can be seen later from examples.

Other materials may further be contained in the surface layer 43, when necessary. Generally guanamine derivatives have electrically insulating properties. Therefore, when the content of the guanamine-skeleton moiety is increased in the surface of the development roller, charging-up or dielectric separation is apt to take place in the surface layer 43, and when this takes place, the surface of the development roller becomes electrically unstable and abnormal images such as ghost image are apt to be formed.

This problem can be solved by controlling the electric resistivity of the surface layer 43. This can be carried out by adding to the surface layer 43 the same electroconductivity imparting agent as used in the elastic layer 42. It is preferable that a volume resistivity R1 of the elastic layer 42 be smaller than a volume resistivity R2 of the surface layer 43, that is, R1<R2. In particular, when the volume resistivity R1 of the elastic layer 42 is low, electric leakage to the photoconductor can be prevented by increasing the volume resistivity R2 of the surface layer 43. Furthermore, by constructing the elastic layer 42 and the surface layer 43 in this way, adverse effects of non-uniformity of the volume resistance of the elastic layer 42 can be reduced.

The above-mentioned surface layer 43 can be obtained, for example, by providing, on the surface of the elastic layer 42 of the development roller, a material with reduced electric resistivity by uniformly dispersing therein electroconductive particles, whereby toner can be charged with a sufficient quantity of charges, with a reduction in the charge-up potential of the development roller, and improved image quality free of ghost images can be obtained even when used under high temperature and high humidity conditions for an extended period of time.

When the surface layer 43 is formed of a resin in which the electroconductive particles are contained, the flexibility of the surface layer 43 tends to be lowered and the surface layer 43 tends to have defects such as the formation of cracks. The larger the content of the electroconductive particles, the more conspicuous this tendency. In contrast to this, when particles of carbon black are used, the reduction in resistivity per unit amount thereof is larger than that of other electro-conductive particles, so that the amount of carbon black particles to be added can be reduced. The result is that when carbon black particles are used, the ratio of the contents of resin components to carbon is larger than the case where electroconductive particles other than carbon black particles are employed, whereby the reduction in flexibility of the surface layer 43 can be decreased. Furthermore, when carbon black particles are used, the ratio of the contents of resin components to carbon black is larger than the case where electroconductive particles other than carbon black particles are employed, so that the effects of the resin components having the guanamine-skeleton can be increased.

When the condensation cross-linked compound, which is made from a polymer or prepolymer having hydroxyl groups at a main chain or a side chain thereof and at least one component selected from the group consisting of guanamine, its derivative and a guanamine condensation compound, serving as the guanamine-skeleton-deriving compound, is used, and the above-mentioned electro-conductive particles are contained therein, toner can be charged with a sufficient quantity of charges, with a reduction in the charge-up potential of the development roller, and improved image quality free of ghost images can be obtained even when used under high temperature and high humidity conditions for an extended period of time, and also there can be avoided the contamination of the photoconductor with the development roller while in contact with the development roller, and the occurrence of defects such as the cracking of the surface of the surface layer 43 while in use for an extended period of time.

When the condensation cross-linked product, which is made from the fluorine-contained copolymer and at least one compound selected from the group consisting of guanamine, its derivative and a guanamine condensation compound, serving as the guanamine-skeleton-deriving compound, is used, and the above-mentioned electro-conductive particles are contained therein, toner can be charged with a sufficient quantity of charges, and improved image quality free of the fogging of the background of image and abnormal images such as ghost images can be obtained even when used under high temperature and high humidity conditions for an extended period of time, and also the occurrence of defects such as the cracking of the surface of the surface layer 43 while in use for an extended period of time, can be prevented, whereby high durability of the development roller can be secured.

It is preferable to add a lubricity-imparting agent such as a solid lubricant to the surface layer 43 in order to improve slip properties of toner on the development roller. By the addition of the lubricity-imparting agent, not only the slip properties of the development roller for allowing toner to slip on the development roller can be improved, but also the fixing of the toner in the form of a film to the development roller, which may be referred to as the filming of toner, can be prevented, whereby the durability of the development roller can be improved.

Examples of solid lubricants having the above-mentioned performance are particles comprising any of molybdenium sulfide, graphite, boron nitride, mica, fluorographite, silver—niobium selenide, calcium chloride—graphite, talc, and a fatty acid metal salt such as zinc stearate. The lubricity-imparting agent may also be silica, such as hydrophilic silica and hydrophobic silica, or a metal oxide.

When changes in the ambient conditions are taken into consideration, hydrophobic silica is preferable as a solid lubricant. Examples of the metal oxide are aluminum oxide and titanium dioxide. It is preferable that these metal oxides be hydrophobic.

Furthermore, these lubricity-imparting agents may also have a function of adjusting electric resistivity. For instance, when graphite particles are used as electroconductive spherical particles, the electro-conductivity thereof is not impaired, so that graphite particles are preferably employed. Metal oxides also function as conductivity-imparting agents.

These lubricity-imparting agents can be used in such a range of amount that their lubricity-imparting function can be attained. The amount thereof is usually 10 parts by weight or less to 100 parts by weight of a matrix resin. When the added amount is excessive, the formation of a thin layer of toner on the development roller is unstable, so that there may be a case where images formed are non-uniform. When the solid lubricant is used, the particles thereof should be in the form of a power or a finely-divided particles which are small enough to form a thin layer.

The surface layer 43 can be formed by any means. For example, the electroconductivity-imparting agent, the solid lubricant and other ingredients are dispersed or dissolved in a solution, and the mixture is then diluted so as to have an appropriate viscosity and directly coated on the surface of the elastic layer 42 by any of varieties of methods such as a dipping method, a spray coating method and a roll coating method. Alternatively, a tube made of the guanamine-skeleton containing compound is made by any molding method, and a roller substrate provided with an elastic layer is then coated with the tube, whereby the surface layer 43 is formed.

It is preferable that the surface layer 43 have a thickness of 30 μm or less. When the thickness of the surface layer 43 exceeds 30 μm, the hardness of the surface layer 43 is so increased that the mechanical strength of the surface layer 43 is lowered, and cracks are formed in the surface layer 43. Furthermore, when the development roller is not rotated, with a toner regulation blade and a photoconductor maintained in contact with the surface of the development roller, slight concaves are formed as contact traces on the surface of the development roller. However, when the restoring force of the concaves is weak, images with a non-uniform image density are formed.

There is no particular lower limit to the thickness of the surface layer 43 as long as the surface layer 43 can perform its function. The thickness is 1 μm or more, usually 5 to 10 μm or more.

The thus fabricated development roller can be used as a development roller for use in electrophotographic copying machines, printers, facsimile apparatus, or image formation apparatus comprising these machines in a composite form.

In particular, the development roller of the present invention is expected to be a useful development roller when used as a development roller for an image formation apparatus which uses a dry type non-component toner because of its sufficient durability for use in practice, with simple maintenance and inexpensive cost.

EXAMPLES

[Preparation of Substrate Roll]

A core shaft 41 made of a metal (SUS) with a diameter of 8 mm was coated with an adhesive agent. On the outer peripheral surface of the cores haft 41 coated with the adhesive agent, an elastic layer 42 with the following composition was formed by cross extrusion molding, followed by vulcanization with application of heat:

| | Parts by Weight |
|---|---|
| Epichlorohydrin rubber | 100 |
| Calcium carbonate | 30 |
| Vulcanization accelerator | 3 |
| Vulcanizing agent (sulfur) | 1 |

The elastic layer provided core shaft was ground down so as to set the diameter thereof at 20 mm, using a cylindrical grinder, and a substrate roller with the elastic layer 42 having a thickness of 6 mm, was prepared.

Example 1

Figure 2:
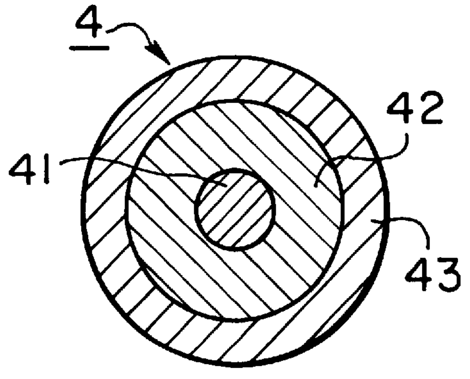
FIG. 2 is a schematic cross-sectional view of the development roller of the present invention.

The surface of the substrate roller was spray coated with a predetermined amount of each mixed liquid with a composition in Experiment No. 1 to No. 5 shown in TABLE 1 to form a surface layer 43 and was then subjected to heat treatment at 150° C. for 1 hour, whereby development rollers with Experiment Nos. 1 to 5, each having a structure as shown in FIG. 2, were fabricated. As benzoguanamine, a commercially available benzoguanamine (Trademark "MYCOAT 106" made by Mitusi Cytech Ltd.) was used, as acryl polyol, a commercially available acryl polyol (Trademark "RX-2A" made by Ohashi Chemical Industries, Ltd. was used, and as polyester polyol, a commercially available polyester polyol made by Dainippon Ink & Chemicals, Incorporated was used.

TABLE 1

| Ex. No. | Composition of Coated Surface Layer | |
|---|---|---|
| 1 | Acrylic Resin (70) | Benzoguanamine (30) |
| 2 | Acryl Polyol (70) | Benzoguanamine (30) |
| 3 | Polyester Polyol (70) | Benzoguanamine (30) |
| 4 | Acrylic Resin (100) | |
| 5 | Acryl Polyol (70) | Polyisocyanate (30) |

Each of the development rollers was subjected to various evaluation tests by incorporating each development roller in a copying machine.

The toner charging performance, the fogging of the background of image, and the stability of image density were evaluated under normal conditions at 23° C., 50%RH, and also under high temperature and high humidity conditions at 30° C., 80%RH. The stability in the use for an extended period of time was evaluated by checking the respective performances before and after making 10,000 copies. Furthermore, the contamination of the photoconductor with the development roller while the development roller was allowed to stand in contact with the photoconductor was evaluated, and the formation of cracks in the surface layer 43 after making 10,000 copies was also evaluated.

The results are shown in TABLE 2. In TABLE 2, mark "⊚" denotes "excellent", mark "○" denotes "good", mark "Δ" denotes "slightly inferior", and mark "X" denotes "inferior".

TABLE 2

| Example No. | | | 1 | 2 | 3 | 4 | 5 |
|---|---|---|---|---|---|---|---|
| Surface Layer | | | Acrylic resin/ Benzoguanamine resin (not cross-linked) | Acryl polyol/ Benzoguanamine (cross-linked) | Polyester polyol/ Benzoguanamine (cross-linked) | Acrylic resin | Acryl polyol/ Isocyanate (cross-linked) |
| Initial Stage | Charge quantity of toner (μC/g) | 23° C. 50% RH | −20.4 | −20.8 | −23.6 | −12.5 | −13.9 |
| | | 30° C. 80% RH | −17.3 | −17.3 | −20.0 | −9.3 | 10.4 |
| | Image quality: Fogging of background | 23° C. 50% RH | ⊚ | ⊚ | ⊚ | Δ | Δ |
| | | 30° C. 80% RH | ⊚ | ⊚ | ⊚ | X | Δ |

TABLE 2-continued

| Example No. | | | 1 | 2 | 3 | 4 | 5 |
|---|---|---|---|---|---|---|---|
| | Image quality: Stability of image density | 23° C. 50% RH | ◎ | ◎ | ◎ | Δ | Δ |
| | | 30° C. 80% RH | ◎ | ◎ | ◎ | X | Δ |
| | Contamination of photoconductor with development roller | | Δ | ○ | ○ | Δ | ○ |
| After Making 10,000 Copies | Charge quantity of toner (μC/g) | 23° C. 50% RH | −15.9 | −18.2 | −19.6 | −8.3 | −11.0 |
| | | 30° C. 80% RH | −12.6 | −15.7 | −16.3 | −6.7 | −8.9 |
| | Image quality: Fogging of background | 23° C. 50% RH | ○ | ○ | ○ | X | Δ |
| | | 30° C. 80% RH | Δ | ○ | ○ | X | X |
| | Image quality: Following-up of solid image | 23° C. 50% RH | ○ | ○ | ○ | X | Δ |
| | | 30° C. 80% RH | Δ | ○ | ○ | X | X |
| | Cracks in surface layer | | Observed | Not observed | Not observed | Not observed | Observed |

The comparison between the development roller with Experiment No. 1 to No. 3 and the development roller with Experiment No. 4 indicates that the development rollers with Experiment Nos. 1 to 3, having the surface layer 43 including the guanamine-skeleton-containing compound are capable of charging toner with a large quantity of charges and have an improved toner charging performance, and accordingly are capable of significantly improving image quality in view of the fogging of the background of image and the stability of image density.

In the development roller with Experiment No. 2, acryl polyol having hydroxyl groups at the main chain and side chains in employed in the coated surface layer 43 thereof. When the surface layer 43 is subjected to heat treatment, dehydration and condensation are caused to take place in the surface layer 43 to induce a cross-linking reaction at the hydroxyl groups which serve as cross-linking points. The surface layer 43 thus obtained has an increased film strength and no cracks are formed therein even after making 10,000 copies. Furthermore, this development roller has sufficient durability even when used for an extended period of time and has any problem with respect to the contamination of the photoconductor with the development roller.

The comparison between the development roller with Experiment No. 2 and the development roller with Experiment No. 1 indicates that in the development roller with Experiment No. 2, the guanamine-skeleton containing compound is cross-linked, while in the development roller with Experiment No. 1, acryl resin which is not reactive with a guanamine compound is employed. In comparison with the development roller with Experiment No. 1 in which there is no cross-linking in the surface layer 43, the development roller with Experiment No. 2, in which the guanamine-skeleton containing compound is cross-linked in the surface layer 43, is improved on the performance of the development roller of not contaminating the photoconductor, and is free of cracks, and has improved durability because the bleeding of plasticizers and low-molecular weight components from the elastic layer 42 is blocked by the surface layer 43.

In the development roller with Experiment No. 5, acryl polyol having reactive hydroxyl groups at a terminal thereof is cross-linked with an isocyanate compound. In this development roller, the contamination of the photoconductor and the cracking of the surface layer 43 does not take place. However, since there is no guanamine compound contained in the surface layer 43, the toner charging performance is poor, and the fogging of the background of image takes places, and the image density stability is poor.

In the development roller with Experiment No. 3, polyester polyol is employed instead of the acryl polyol employed in the development roller with Experiment No. 2. In the development roller with Experiment No. 3, the toner charge performance is good, and the fogging of the background of image does not take place, and the image density stability is good, and there is no problem with respect to the durability and the performance of the development roller of not contaminating the photoconductor. Thus, even though the polyester polyol is employed, no cracking takes place and increased durability is secured by the introduction of the guanamine compound and by the cross-linking using the guanamine compound.

Example 2

In order to confirm the effects of electroconductive particles which are added to the surface layer 43, a surface layer 43 was provided on the same substrate roll as prepared in Example 1, with the composition of each surface layer being as indicated in TABLE 3, whereby development rollers with Experiment Nos. 21 to 24 were fabricated with such a structure as shown in FIG. 2. In TABLE 3, benzoguanamine and acryl polyol are respectively the same as those employed in Example 1.

TABLE 3

| Ex. No. | Composition of Coated Surface Layer | |
|---|---|---|
| 21 | Acrylic Resin (70)<br>Tin Oxide (60) | Benzoguanamine (30) |
| 22 | Acryl Polyol (70)<br>Tin Oxide (60) | Benzoguanamine (30) |
| 23 | Acryl Polyol (70)<br>Acetylene Black (20) | Benzoguanamine (30) |
| 24 | Acryl Polyol (70) | Benzoguanamine (30) |

Each of the development rollers was subjected to various evaluation tests by incorporating each development roller in a copying machine.

The toner charging performance, a roller surface charging-up performance, and the image quality based on the formation of ghost image were evaluated under normal use conditions at 23° C., 50%RH, and also under high temperature and high humidity conditions at 30° C. 80%RH. The stability in the use for an extended period of time was evaluated by checking the respective performances before and after making 10,000 copies. Furthermore, the contamination of the photoconductor with the development roller while the development roller was allowed to stand in contact with the photoconductor was evaluated, and the formation of cracks in the surface layer 43 after making 10,000 copies was also evaluated.

The results are shown in TABLE 4. In TABLE 4, mark "◎" denotes "excellent", mark "○" denotes "good", mark "Δ" denotes "slightly inferior", and mark "X" denotes "inferior".

TABLE 4

| | Example No. | | 21 | 22 | 23 | 24 (=No. 2) |
|---|---|---|---|---|---|---|
| | Surface Layer | | Acrylic resin/Benzo guanamine resin (not cross-linked)/ Tin oxide | Acryl polyol /Benzo-guanamine (cross-linked)/ Tin oxide | Acryl polyol /Benzo guanamine (Cross-linked)/ Acetylene black | Acryl polyol /Benzo-guanamine (cross-linked) |
| | Resistivity of Surface Layer | | $1.7 \times 10^8$ | $2.2 \times 10^8$ | $4.3 \times 10^8$ | $2.1 \times 10^{13}$ |
| Initial Stage | Charge quantity of toner (μC/g) | 23° C. 50% RH | −18.9 | −19.1 | −19.3 | −20.8 |
| | | 30° C. 80% RH | −16.2 | −17.0 | −17.1 | −17.3 |
| | Roller surface charging-up potential (V) | 23° C. 50% RH | 5 | 6 | 5 | 78 |
| | | 30° C. 80% RH | 3 | 3 | 3 | 20 |
| | Image quality: Ghost image | 23° C. 50% RH | ◎ | ◎ | ◎ | X |
| | | 30° C. 80% RH | ◎ | ◎ | ◎ | Δ |
| | Contamination of photoconductor with development roller | | Δ | ○ | ○ | ○ |
| After Making 10,000 Copies | Charge quantity of toner (μC/g) | 23° C. 50% RH | −15.0 | −16.2 | −15.1 | −18.2 |
| | | 30° C. 80% RH | −12.2 | −14.1 | −11.9 | −15.7 |
| | Roller surface charging-up potential (V) | 23° C. 50% RH | 6 | 4 | 4 | 69 |
| | | 30° C. 80% RH | 2 | 3 | 2 | 14 |
| | Image quality: Following-up of solid image | 23° C. 50% RH | ○ | ○ | ○ | X |
| | | 30° C. 80% RH | Δ | ○ | ○ | Δ |
| | Cracks in surface layer | | Observed | Slightly observed | Not observed | Observed |

The comparison between the development rollers with Experiment Nos. 21 to 23 and the development roller with Experiment No. 24 in which no electroconductive particles are contained indicate that by containing the electroconductive particles in the surface layer 43, the roller surface charging-up potential is decreased, and the formation of ghost image is also decreased.

In the development roller with Experiment No. 22, acryl polyol which is reactive with the guanamine compound is employed in the coated surface layer 43 thereof. When the coated surface layer 43 is subjected to heat treatment, dehydration and de-alcohol are caused to take place between the hydroxyl groups of the acryl polyol and the guanamine compound in the surface layer 43 to induce a cross-linking reaction at the hydroxyl groups which serve as cross-linking points.

The comparison between the development roller with Experiment No. 22 and the development roller with Experiment No. 21 indicates that in the development roller with Experiment No. 22, the bleeding of plasticizers and low-molecular-weight components is blocked, so that the performance of the development roller of not contaminating the photoconductor is improved, and the strength of the surface layer 43 is also improved by the cross-linking, and the durability thereof with respect to the mechanical strength is also improved thereof without the formation of cracks in the surface layer 43.

In the development roller with Experiment No. 23, acetylene black is used as the electroconductive particles instead of the electroconductive particles in the development roller with Experiment No. 22, whereby the toner charging performance is improved, the roller surface charging-up potential is decreased, without the formation of ghost image, and the strength of the surface layer 43 is also improved. There are no defects such as cracks in the surface layer 43 of the development roller even when used for an extended period of time, thus securing improved durability.

Example 3

In order to confirm the effects of fluorine-contained copolymer which was added to the surface layer 43, a surface layer 43 was provided on the same substrate roll as that for the development roller with Experiment No. 1, with the composition of each surface layer being as indicated in TABLE 5, whereby development rollers with Experiment Nos. 31 to 33 were fabricated with such a structure as shown in FIG. 2. In TABLE 5, benzoguanamine was the same as that employed in Example 1, and as the fluorine-contained copolymer, fluoro-olefin vinyl ether copolymer (Trademark "Lumifron" made by Asahi Glass Co., Ltd.) was employed.

TABLE 5

| Ex. No. | Composition of Coated Surface Layer | |
|---|---|---|
| 31 | Fluorine-contained Copolymer (70) | Benzoguanamine (30) |
| 32 | Fluorine-contained Copolymer (70) Carbon Black (20) | Benzoguanamine (30) |
| 33 | Fluorine-contained Copolymer (70) | Polyisocyanate (30) |

Each of the development rollers was subjected to various evaluation tests by incorporating each development roller in a copying machine.

The toner charging performance, and image quality based on the occurrence of the fogging of the background of image and the formation of ghost image were evaluated under normal use conditions at 23° C., 50%RH, and also under high temperature and high humidity conditions at 30° C., 80%RH. The stability when used for an extended period of time was evaluated by checking the respective performances before and after making 10,000 copies. Furthermore, the contamination of the photoconductor with the development roller while the development roller was allowed to stand in contact with the photoconductor was evaluated, and the formation of cracks in the surface layer 43 was also evaluated after making 10,000 copies.

The results are shown in TABLE 6. In TABLE 6, mark "◎" denotes "excellent", mark "○" denotes "good", mark "Δ" denotes "slightly inferior", and mark "X" denotes "inferior".

TABLE 6

| Example No. | | | 31 | 32 | 33 |
|---|---|---|---|---|---|
| | Surface Layer | | Fluorine-contained copolymer/ Benzoguanamine (cross-linked) | Fluorine-contained copolymer/ Carbon black/ Benzoguanamine (cross-linked) | Fluorine-contained copolymer/ Isocyanate (cross-linked) |
| Initial Stage | Charge quantity of toner (μC/g) | 23° C. 50% RH | −19.5 | −17.8 | −10.2 |
| | | 30° C. 80% RH | −17.4 | −15.7 | −8.7 |
| | Image quality: Fogging of background | 23° C. 50% RH | ◎ | ◎ | Δ |
| | | 30° C. 80% RH | ◎ | ◎ | Δ |
| | Image quality: Abnormal images such as ghost images | 23° C. 50% RH | ○ | ◎ | Δ |
| | | 30° C. 80% RH | ○ | ◎ | Δ |
| | Contamination of photoconductor with development roller | | ○ | ○ | ○ |
| After Making 10,000 Copies | Charge quantity of toner (μC/g) | 23° C. 50% RH | −16.2 | −16.9 | −8.7 |
| | | 30° C. 80% RH | −14.2 | −14.8 | −7.1 |
| | Image quality: Fogging of background | 23° C. 50% RH | ○ | ○ | Δ |
| | | 30° C. 80% RH | ○ | ○ | X |
| | Image quality: Abnormal images such as ghost images | 23° C. 50% RH | ○ | ◎ | Δ |
| | | 30° C. 80% RH | Δ | ○ | X |
| | Cracks in surface layer | | Small cracks in end portions | Not observed | Large cracks in end portions |

In the development roller with Experiment No. 31, the fluorine-contained copolymer which is reactive with the guanamine compound is employed in the composition of the coated surface layer 43. The coated surface layer 43 is subjected to heat treatment so as to induce a cross-linking reaction in the composition of the coated surface layer 43. In the development roller with Experiment No. 33, the fluorine-contained copolymer is cross-linked with an isocyanate compound.

The comparison between the development roller with Experiment No. 31 and the development roller with Experiment No. 33 indicates that when the guanamine compound and the fluorine-contained copolymer are cross-linked, the toner charging performance and the image quality are improved in view of the fogging of the background of image and the formation of ghost image.

In the development roller with Experiment No. 31, the performance is good in the initial stage except slight occurrence of ghost images due to the roller surface charging-up potential, and in the use for an extended period of time, slight cracks are observed in the surface layer 43 at a contact portion of the surface layer 43 with a terminal sealing number due to the dielectric breakdown and abrasion of the resin contained in the surface layer 43.

In contrast to this, in the development roller with Experiment No. 32, carbon black is further added to the surface layer 43 in the development roller with Experiment No. 31, whereby the lowering of the resistivity of the surface layer 43 is made possible, and no abnormal images such as ghost image are formed at the initial stage, the strength of the coated surface layer 43 is increased, and there are no cracks in the surface layer 43 of the development roller even when used for an extended period of time, thus securing improved durability.

Example 4

In order to confirm the effects of the combined use of a lubricity-imparting agent and an electric resistivity adjustment agent, a surface layer 43 was provided on the same substrate roll as that employed in Example 1, by spray coating a predetermined amount of each mixed liquid with the composition as specified in TABLE 7, with a thickness as specified in TABLE 7, and was then subjected to heat treatment at 150° C. for 1 hour, whereby development rollers with Experiment Nos. 41 to 43, 45 to 47, and 49, each having a structure as shown in FIG. 2, were fabricated.

TABLE 7

| Ex. No. | Composition of Coated Surface Layer (parts by weight) | | Thickness ($\mu$m) |
|---|---|---|---|
| 41 | Acrylic Resin (70)<br>Acetylene Black (8) | Benzoguanamine (30)<br>Graphite (2) | 15 |
| 42 | Acryl Polyol (70)<br>Ketjen Black (5) | Benzoguanamine (30)<br>Graphite (1) | 21 |
| 43 | Polyester Polyol (70)<br>Ketjen Black (5) | Benzoguanamine (30)<br>Graphite (1) | 25 |
| 45 | Acrylic Resin (100) | | 15 |
| 46 | Acryl Polyol (70) | Polyisocyanate (30) | 20 |
| 47 | Acryl Polyol (70)<br>Ketjen Black (5) | Benzoguanamine (30) | 21 |
| 49 | Acryl Polyol (70)<br>Ketjen Black (5) | Benzoguanamine (30)<br>Graphite (1) | 35 |

A core shaft 41 made of a metal (SUS) with a diameter of 8 mm was coated with an adhesive agent. On the outer peripheral surface of the core shaft 41 coated with the adhesive agent, an elastic layer 42 made of an NBR rubber with the following composition was formed by cross extrusion molding, followed by vulcanization with application of heat:

| | Parts by Weight |
|---|---|
| NBR rubber | 100 |
| Ketjen black | 10 |
| Calcium carbonate | 30 |

-continued

| | Parts by Weight |
|---|---|
| Vulcanization accelerator | 2 |
| Vulcanizing agent (sulfur) | 1 |

The elastic layer provided core shaft was ground down so as to set the outer diameter thereof at 20 mm, using a cylindrical grinder, whereby a substrate roller including the elastic layer 42 with a thickness of 6 mm was prepared.

The surface of the substrate roller was spray coated with a predetermined amount of a mixed liquid with the following formulation so as to have a thickness of 15 $\mu$m, whereby a surface layer 43 was provided on the elastic layer 42:

| | Parts by Weight |
|---|---|
| Acryl polyol | 70 |
| Benzoguanamine | 30 |
| Ketjen Black | 5 |
| Graphite | 1 |

The surface layer 43 was then subjected to heat treatment at 150° C. for 1 hour, whereby development roller No. 44, having a structure as shown in FIG. 2, was fabricated.

Development roller with Experiment No. 48 was fabricated in the same procedure as that for the above fabricated development roller with Experiment No. 44 except that the amount of ketjen black used in the surface layer 43 was changed to 20 parts by weight.

Each of the development rollers with Experiments Nos. 41 to 49 was subjected to various evaluation tests by incorporating each development roller in a copying machine.

The toner charging performance, the fogging of the background of image, and the stability of image density were evaluated under normal use conditions at 23° C., 50%RH, and also under high temperature and high humidity conditions at 30° C., 80%RH. The stability when used for an extended period of time was evaluated by checking the respective performances before and after making 10,000 copies. Furthermore, the contamination of the photoconductor with the development roller and traces of pressure contact while the development roller was allowed to stand in contact with the photoconductor were evaluated, and the formation of cracks in the surface layer 43 after making 10,000 copies was also evaluated.

The results are shown in TABLE 8 and TABLE 9. In these tables, the values of the volume resistivities of the elastic layer 42 and the surface layer 43 in each development roller are provided. In TABLE 8 and TABLE 9, mark "◎" denotes "excellent", mark "○" denotes "good", mark "Δ" denotes "slightly inferior", and mark "X" denotes "inferior".

TABLE 8

| Example No. | | | 41 | 42 | 43 | 44 |
|---|---|---|---|---|---|---|
| Initial Stage | Charge quantity of toner (μC/g) | 23° C. 50% RH | −22.4 | −22.9 | −25.8 | −23.5 |
| | | 30° C. 80% RH | −19.3 | −19.5 | −22.1 | −18.0 |
| | Image quality: Fogging of background | 23° C. 50% RH | ⊚ | ⊚ | ⊚ | ○ |
| | | 30° C. 80% RH | ⊚ | ⊚ | ⊚ | ○ |
| | Image quality: Stability of image density | 23° C. 50% RH | ⊚ | ⊚ | ⊚ | ○ |
| | | 30° C. 80% RH | ⊚ | ⊚ | ⊚ | ○ |
| | Contact marks made by contact standing | | ○ | ○ | ⊚ | ○ |
| | Resistivity (Ω•cm) Elastic layer (R1) | | 5.0E6 | 6.3E6 | 4.2E6 | 2.3E6 |
| | Surface layer (R2) | | 8.5E8 | 7.0E7 | 6.6E8 | 9.4E7 |
| After Making 10,000 Copies | Charge quantity of toner (μC/g) | 23° C. 50% RH | −15.9 | −18.2 | −19.6 | −11.0 |
| | | 30° C. 80% RH | −12.6 | −15.7 | −16.3 | −8.9 |
| | Image quality: Fogging of background | 23° C. 50% RH | ○ | ○ | ○ | ○ |
| | | 30° C. 80% RH | Δ | ○ | ○ | ○ |
| | Image quality: Following-up of solid image | 23° C. 50% RH | ○ | ○ | ○ | ○ |
| | | 30° C. 80% RH | Δ | ○ | ○ | ○ |
| | Cracks in surface layer | | Δ | ⊚ | ⊚ | ⊚ |
| | Abrasion of surface layer and filming of toner | | Δ | ○ | ○ | ○ |

TABLE 9

| Example No. | | | 45 | 46 | 47 | 48 | 49 |
|---|---|---|---|---|---|---|---|
| Initial Stage | Charge quantity of toner (μC/g) | 23° C. 50% RH | −14.5 | −16.9 | −23.0 | −20.0 | −25.1 |
| | | 30° C. 80% RH | −11.3 | −13.4 | −19.2 | −18.5 | −23.4 |
| | Image quality: Fogging of back-ground | 23° C. 50% RH | Δ | Δ | ⊚ | ○ | ⊚ |
| | | 30° C. 80% RH | X | Δ | ⊚ | ○ | ⊚ |
| | Image quality: Stability of image density | 23° C. 50% RH | Δ | Δ | ⊚ | X | ⊚ |
| | | 30° C. 80% RH | X | Δ | ○ | X | ⊚ |
| | Contact marks made by con-tact standing | | X | ○ | ○ | Δ | X |
| | Resistivity (Ω · cm) Elastic layer (R1) | | 5.1E6 | 6.5E6 | 4.5E6 | 5.9E6 | 3.1E6 |
| | Surface layer (R2) | | 4.2E13 | 3.0E13 | 5.1E8 | 3.4E2 | 5.7E8 |
| After Making 10,000 Copies | Charge quantity of toner (μC/g) | 23° C. 50% RH | −10.3 | −12.0 | −19.9 | −17.5 | −23.2 |
| | | 30° C. 80% RH | −8.7 | −8.7 | −16.8 | −14.9 | −20.5 |
| | Image quality: Fogging of back-ground | 23° C. 50% RH | X | Δ | ○ | ○ | ○ |
| | | 30° C. 80% RH | X | X | ○ | ○ | ○ |
| | Image quality: Follow-ing-up of solid image | 23° C. 50% RH | X | Δ | ○ | Δ | ○ |
| | | 30° C. 80% RH | X | X | Δ | X | ○ |
| | Cracks in sur-face layer | | X | Δ | ⊚ | ⊚ | X |
| | Abrasion of surface layer and filming of toner | | X | X | X | ○ | ○ |

The comparison between the development rollers with Experiment Nos. 41 and 42 and the development rollers with Experiment No. 45 and 46 (Comparative Examples) indicates that by containing the guanamine compound in the coated surface layer 43, the toner charging performance is improved, and the image quality is also improved in view of the fogging of background and the stability of image density.

However, in the development roller with Experiment No. 41, the acryl resin having no reactivity with the guanamine compound is used and not cross-linked, so that the bleeding of plasticizers and low-molecular-weight components from the elastic layer 42 is not blocked, and the contamination of the photoconductor with the development roller takes place, and also cracks are observed in the surface layer 43.

In the development roller with Experiment No. 42, the acryl polyol in which hydroxyl groups are introduced into the main chain and side chains thereof is employed in the surface layer 43, so that when the surface layer 43 is subjected to heat treatment, dehydration and de-alcohol reaction takes place between the hydroxyl groups and the guanamine compound to induce a condensation reaction between them, and a cross-linking reaction takes places between the acryl polyol and the guanamine compound with the hydroxyl groups being cross-linking points, whereby the strength of the surface layer 43 is increased, and no cracks are formed in the surface layer 43 even when used for an extended period of time, with high durability being secured. This development roller is also improved on the performance of the development roller of not contaminating the photoconductor.

In the development rollers with Experiment No. 43 and Experiment No. 44, because of the condensation reaction due to the dehydration and de-alcohol reaction from the hydroxyl group and the guanamine compound, a cross-linking reaction takes place with the hydroxyl groups as being cross-linking points, whereby the strength of the surface layer 43 is increased, and no cracks are formed in the surface layer 43 even when used for an extended period of time, whereby high durability of the development rollers is secured. Furthermore, the performance of the development rollers of not contaminating the photoconductor is improved.

Thus, in the development rollers with Experiment Nos. 41 to 44, since graphite serving as a solid lubricant is added to the surface layer 43, the filming of toner is difficult to take place on the surface of the development rollers over an extended period of time.

In contrast to this, in the development roller with Experiment No. 45, since only the acryl resin is used, the surface layer 43 does not have flexibility and is cracked with time and abraded while in use for an extended period of time.

In the development roller with Experiment No. 46, an acryl polyol having hydroxyl groups is cross-linked by an isocyanate compound in the surface layer 43. Therefore, the contamination of the photoconductor with the development roller does not take place, and no cracks are formed in the surface layer 43. However, since no guanamine compound is used in the surface layer 43, the toner charging performance of the development roller is poor, and the fogging of the background of image takes place. Furthermore, the image density stabilizing performance of the development roller is also poor.

In the development roller with Experiment No. 47, graphite serving as a solid lubricant is not contained in the surface layer 43, so that the surface layer 43 is abraded with time, and the filming of toner on the surface of the development roller occurs.

In the development roller with Experiment No. 48, the elastic layer 42 is of a carbon-dispersed type. The elastic layer 42 has a volume resistivity R1 which is set larger than a volume resistivity R2 of the surface layer 43, that is, R1>R2, by increasing the amount of carbon added to the surface layer 43. In this case, non-uniformity of the resistivity of the elastic layer 42 appears in the image formed.

In the development roller with Experiment No. 49, the surface layer 43 has an increased thickness, so that the toner charging performance thereof is good. However, the hardness of the surface layer 43 is increased, and the flexibility of the surface layer 43 is decreased, so that members such as the photoconductor and a toner layer thickness regulation blade which come into contact with the development roller make pressure contact traces on the surface of the development roller, and the pressure contact traces appear as non-uniformity in images formed. Furthermore, cracks are formed in the surface layer 42 of the development roller with time.

Example 5

In order to confirm the effects of the combined use of electroconductive particles and a metal oxide, a surface layer 43 was provided on the same substrate roll as that employed in Example 1, by spray coating a predetermined amount of each mixed liquid with the composition as specified in TABLE 10, with a thickness as specified in TABLE 10, and was then subjected to heat treatment at 150° C. for 1 hour, whereby development rollers with Experiment Nos. 51 to 53, 55, to 57 and 59, each having a structure as shown in FIG. 2, were fabricated.

TABLE 10

| Ex. No. | Composition of Coated Surface Layer (parts by weight) | | Thickness ($\mu$m) |
|---|---|---|---|
| 51 | Acrylic Resin (70)<br>Acetylene Black (8) | Benzoguanamine (30)<br>Silica (1) | 15 |
| 52 | Acryl Polyol (70)<br>Ketjen Black (5) | Benzoguanamine (30)<br>Silica (1) | 21 |
| 53 | Polyester Polyol (70)<br>Ketjen Black (5) | Benzoguanamine (30)<br>Titanium Dioxide (1) | 25 |
| 55 | Acrylic Resin (100) | | 15 |
| 56 | Acryl Polyol (70) | Polyisocyanate (30) | 20 |
| 57 | Acryl Polyol (70)<br>Ketjen Black (5) | Benzoguanamine (30) | 21 |
| 59 | Acryl Polyol (70)<br>Ketjen Black (5) | Benzoguanamine (30)<br>Silica (1) | 35 |

A core shaft 41 made of a metal (SUS) with a diameter of 8 mm was coated with an adhesive agent. On the outer peripheral surface of the core shaft 41 coated with the adhesive agent, an elastic layer 42 made of an NBR rubber with the following composition was formed by cross extrusion molding, followed by vulcanization with application of heat:

| | Parts by Weight |
|---|---|
| BBR rubber | 100 |
| Ketjen black | 10 |
| Calcium carbonate | 30 |
| Vulcanization accelerator | 2 |
| Vulcanizing agent (sulfur) | 1 |

The elastic layer provided core shaft was ground down so as to set the outer diameter thereof at 20 mm, using a cylindrical grinder, whereby a substrate roller including the elastic layer 42 with a thickness of 6 mm was prepared.

The surface of the substrate roller was then spray coated with a predetermined amount of a mixed liquid with the following formulation so as to have a thickness of 15 $\mu$m, whereby a surface layer 43 was provided:

| | Parts by Weight |
|---|---|
| Acryl polyol | 70 |
| Benzoguanamine | 30 |
| Ketjen Black | 5 |
| Titanium dioxide | 1 |

The surface layer 43 was then subjected to heat treatment at 150° C. for 1 hour, whereby development roller No. 54, having a structure as shown in FIG. 2, was fabricated.

Development roller with Experiment No. 58 was fabricated in the same procedure as that for the above fabricated development roller with Experiment No. 54 except that the amount of ketjen black used in the surface layer 43 was changed to 20 parts by weight.

Each of the development rollers with Experiment Nos. 51 to 59 was subjected to various evaluation tests by incorporating each development roller in a copying machine.

The results are shown in TABLE 11 and TABLE 12, in which mark "◎" denotes "excellence", mark "○" denotes "good", mark "Δ" denotes "slightly inferior", and mark "X" denotes "inferior".

TABLE 11

| Example No. | | | 41 | 42 | 43 | 44 |
|---|---|---|---|---|---|---|
| Initial Stage | Charge quantity of toner ($\mu$C/g) | 23° C. 50% RH | −21.9 | −23.5 | −26.1 | −24.3 |
| | | 30° C. 80% RH | −18.6 | −20.1 | −22.4 | −18.8 |
| | Image quality: Fogging of background | 23° C. 50% RH | ◎ | ◎ | ◎ | ◎ |
| | | 30° C. 80% RH | ○ | ◎ | ◎ | ◎ |
| | Image quality: Stability of image density | 23° C. 50% RH | ◎ | ◎ | ◎ | ◎ |
| | | 30° C. 80% RH | ◎ | ◎ | ◎ | ◎ |
| | Contact marks made by contact standing | | ○ | ○ | ◎ | ○ |
| | Resistivity (Ω•cm) Elastic layer (R1) | | 5.0E6 | 6.3E6 | 4.2E6 | 2.3E6 |
| | Surface layer (R2) | | 8.5E9 | 3.5E8 | 5.2E8 | 2.9E8 |
| After Making 10,000 Copies | Charge quantity of toner ($\mu$C/g) | 23° C. 50% RH | −18.0 | −20.8 | −21.9 | −21.3 |
| | | 30° C. 80% RH | −13.9 | −18.3 | −18.6 | −18.0 |
| | Image quality: Fogging of background | 23° C. 50% RH | ○ | ○ | ○ | ○ |
| | | 30° C. 80% RH | Δ | ○ | ○ | ○ |
| | Image quality: Following-up of solid image | 23° C. 50% RH | ○ | ○ | ○ | ○ |
| | | 30° C. 80% RH | Δ | ○ | ○ | ○ |
| | Cracks in surface layer | | ○ | ◎ | ◎ | ◎ |
| | Abrasion of surface layer and filming of toner | | ○ | ◎ | ○ | ○ |

TABLE 12

| Example No. | | | 55 | 56 | 57 | 58 | 59 |
|---|---|---|---|---|---|---|---|
| Initial Stage | Charge quantity of toner ($\mu$C/g) | 23° C. 50% RH | −14.5 | −16.9 | −23.0 | −20.7 | −25.8 |
| | | 30° C. 80% RH | −11.3 | −13.4 | −19.2 | −19.2 | −24.1 |
| | Image quality: Fogging of background | 23° C. 50% RH | Δ | Δ | ◎ | ○ | ◎ |
| | | 30° C. 80% RH | X | Δ | ◎ | ○ | ◎ |
| | Image quality: Stability of image density | 23° C. 50% RH | Δ | Δ | ◎ | X | ◎ |
| | | 30° C. 80% RH | X | Δ | ○ | X | ◎ |
| | Contact marks made by contact standing | | X | ○ | ○ | Δ | X |
| | Resistivity (Ω · cm) Elastic layer (R1) | | 5.1E6 | 6.5E6 | 4.5E6 | 5.9E6 | 3.1E6 |
| | Surface layer | | 4.2E13 | 3.0E13 | 5.1E8 | 7.8E2 | 8.3E8 |

TABLE 12-continued

| Example No. | | | 55 | 56 | 57 | 58 | 59 |
|---|---|---|---|---|---|---|---|
| After Making 10,000 Copies | (R2) Charge quantity of toner (μC/g) | 23° C. 50% RH | −10.3 | −12.0 | −19.9 | −18.2 | −23.9 |
| | | 30° C. 80% RH | −8.7 | −8.7 | −16.8 | −15.6 | −21.2 |
| | Image quality: Fogging of back-ground | 23° C. 50% RH | X | Δ | ○ | ○ | ○ |
| | | 30° C. 80% RH | X | X | ○ | ○ | ○ |
| | Image quality: Follow-ing-up of solid image | 23° C. 50% RH | X | Δ | ○ | Δ | ○ |
| | | 30° C. 80% RH | X | X | Δ | X | ○ |
| | Cracks in surface layer | | X | Δ | ◎ | ◎ | X |
| | Abrasion of surface layer and filming of toner | | X | X | X | ○ | ○ |

The comparison between the development rollers with Experiment Nos. 51 and 52 and the development rollers with Experiment No. 55 and 56 (Comparative Examples) indicates that by containing the guanamine compound in the coated surface layer 43, the toner charging performance is improved, and the image quality is also improved in view of the fogging of the background of image and the stability of image density.

However, in the development roller with Experiment No. 51, the acryl resin having no reactivity with the guanamine compound is used and not cross-linked, so that the bleeding of plasticizers and low-molecular-weight components from the elastic layer 42 is not blocked, and therefore the contamination of the photoconductor with the development roller takes place, and cracks are also observed in the surface layer 43.

In the development roller with Experiment No. 52, the acryl polyol in which hydroxyl groups are introduced into the main chain and side chains thereof is employed in the surface layer 43, so that when the surface layer 43 is subjected to heat treatment, dehydration and de-alcohol reaction take place between the hydroxyl groups and the guanamine compound to induce a condensation reaction between them, and a cross-linking reaction takes place between the acryl polyol and the guanamine compound with the hydroxyl groups being cross-linking points, whereby the strength of the surface layer 43 is increased, and no cracks are formed in the surface layer 43 even when used for an extended period of time, with high durability being secured. This development roller is also improved on the performance of the development roller of not contaminating the photoconductor.

In the development rollers with Experiment No. 53 and Experiment No. 54, because of the condensation reaction due to the dehydration and de-alcohol from the hydroxyl groups and the guanamine compound, a cross-linking reaction takes place with the hydroxyl groups as being cross-linking points, whereby the strength of the surface layer 43 is increased, and no cracks are formed in the surface layer 43 even when used for an extended period of time, whereby high durability of the development rollers can be secured. Furthermore, the performance of the development rollers of not contaminating the photoconductor is improved.

Furthermore, in the development rollers with Experiment Nos. 51 to 54, since titanium dioxide or silica serving as a solid lubricant is added to the surface layer 43, the filming of toner is difficult to take place on the surface of the development over an extended period of time.

In contrast to this, in the development roller with Experiment No. 55, since only the acryl resin is used, the surface layer 43 does not have flexibility and is cracked with time, and abraded while in use for an extended period of time.

In the development roller with Experiment No. 56, an acryl polyol having hydroxyl groups is cross-linked by an isocyanate compound in the surface layer 43. Therefore, the contamination of the photoconductor with the development roller does not take place, and no cracks are formed in the surface layer 43. However, since no guanamine compound is used in the surface layer 43, the toner charging performance of the development roller is poor, and the fogging of the background of image takes place. Furthermore, the image density stabilizing performance of the development roller is also poor.

In the development roller with Experiment No. 57, neither silica nor titanium dioxide serving as a solid lubricant is contained in the surface layer 43, so that the surface layer 43 is abraded with time, and the filming of toner takes place on the surface of the development roller.

In the development roller with Experiment No. 58, the elastic layer 42 is of carbon-dispersed type. The elastic layer 42 has a volume resistivity R1 which is set larger than a volume resistivity R2 of the surface layer 43, that is, R1>R2, by increasing the amount of carbon black added to the surface layer 43. In this case, non-uniformity of the resistivity of the elastic later 42 appears in the image formed.

In the development roller with Experiment No. 59, the surface layer 53 has an increased thickness, so that the toner charging performance thereof is good. However, the hardness of the surface layer 43 is increased, and the flexibility of the surface layer 43 is decreased, so that members such as the photoconductor and a toner layer thickness regulation blade which come into contact with the development roller make pressure contact traces on the surface of the development roller, and the pressure contact traces appear as non-uniformity in the images formed. Furthermore, cracks are formed with time.

Example 6

In order to confirm the effects of the hydroxyl value and Tg of a prepolymer which is cross-linked with benzogaunamine, a surface layer 43 was provided on the same substrate roll as that of the development roller with Experiment No. 1 in Example 1 in the same procedure as in Example 1 except that the composition thereof was changed as specified in TABLE 13, whereby development rollers with Experiment Nos. 61 to 65, each having a structure as shown in FIG. 2, were fabricated. Benzoguanamine employed in this example is the same as that employed in Example 1.

TABLE 13

| Ex. No. | Composition of Coated Surface Layer |
|---|---|
| 61 | Acryl Polyol B (Hydroxyl value = 100, Tg = 50° C.) (70)<br>Benzoguanamine (30) |
| 62 | Acryl Polyol C (Hydroxyl value = 30, Tg = 70° C.) (70)<br>Benzoguanamine (30) |
| 63 | Acryl Polyol D (Hydroxyl value = 30, Tg = 30° C.) (70)<br>Benzoguanamine (30) |
| 64 | Acryl Polyol D (Hydroxyl value = 30, Tg = 30° C.) (70)<br>Polyisocyanate (30) |
| 65 | Acryl Polyol A (Hydroxyl value = 120, Tg = 40° C.) (70)<br>Benzoguanamine (30) |

Each of the development rollers with Experiment Nos. 61 to 69 was subjected to various evaluation tests by incorporating each development roller in a copying machine.

The toner charging performance and the image quality in view of the fogging of background and the formation of ghost image were evaluated under normal use conditions at 23° C., 50%RH, and also under high temperature and high humidity conditions at 30° C., 80%RH. The stability in the use for an extended period of time was evaluated by checking the respective performances before and after making 10,000 copies. Furthermore, the contamination of the photoconductor with the development roller while the development roller was allowed to stand in contact with the photoconductor were evaluated, and the formation of cracks in the surface layer 43 after making 10,000 copies was also evaluated.

The results are shown in TABLE 14, in which mark "◎" denotes "excellent", mark "○" denotes "good", mark "Δ" denotes "slightly inferior", and mark "X" denotes "inferior".

TABLE 14

| Example No. | | | 61 | 62 | 63 | 64 | 65 |
|---|---|---|---|---|---|---|---|
| Surface Layer | | | Acryl polyol B/ Benzoguanamine (cross-linked) | Acryl polyol C/ Benzoguanamine (cross-linked) | Acryl polyol D/ Benzoguanamine (cross-linked) | Acryl polyol D/ Isocyanate (cross-linked) | Acryl polyol A/ Benzoguanamine (cross-linked) |
| Initial Stage | Charge quantity of toner ($\mu$C/g) | 23° C. 50% RH | −21.5 | −22.0 | −20.8 | −13.9 | −20.4 |
| | | 30° C. 80% RH | −18.2 | −19.2 | −17.3 | −10.4 | −17.3 |
| | Image quality: Fogging of back-ground | 23° C. 50% RH | ◎ | ◎ | ◎ | Δ | ◎ |
| | | 30° C. 80% RH | ◎ | ◎ | ◎ | Δ | ◎ |
| | Image quality: Stability of image density | 23° C. 50% RH | ◎ | ◎ | ◎ | Δ | ◎ |
| | | 30° C. 80% RH | ◎ | ◎ | ◎ | Δ | ◎ |
| | Contamination of photoconductor with development roller | | ○ | ○ | ○ | Δ | ○ |
| After Making 10,000 Copies | Charge quantity of toner ($\mu$C/g) | 23° C. 50% RH | −18.2 | −18.5 | −18.2 | −11.0 | −15.5 |
| | | 30° C. 80% RH | −13.7 | −18.3 | −15.7 | −8.9 | −12.4 |
| | Image quality: Fogging of back-ground | 23° C. 50% RH | ○ | ○ | ○ | Δ | ○ |
| | | 30° C. 80% RH | Δ | ○ | ○ | X | Δ |
| | Image quality: Follow-ing-up of solid image | 23° C. 50% RH | ○ | ○ | ○ | Δ | ○ |
| | | 30° C. 80% RH | Δ | ○ | ○ | X | Δ |
| | Cracks in surface layer | | ○Δ | ○ | ◎ | X | Δ |

The comparison between the development rollers with Experiment Nos. 61 to 63 and 65, and the development roller with Experiment No. 65 (Comparative Example) indicates that in the development rollers with Experiment Nos. 61 to 63 and 65 in which each acryl polyol having hydroxyl groups and benzoguanamine are subjected to a cross-linking and condensation reaction in the surface layer 43 thereof, so that the toner charging performance is improved by the presence of amino group in benzoguamamine, and accordingly the image quality is also improved in view of the fogging of the background of image and the stability of image density.

In the development roller with Experiment No. 65, the surface layer 43 is hardened and the strength thereof is increased due to cross-linking and condensation reaction of acryl polyol A and benzoguanamine. However, no improvement is produced on the reduction in the formation of cracks in the surface layer 43.

In contrast to this, in the development roller with Experiment No. 61, acryl polyol B having a smaller hydroxyl value than that of acryl polyol A used in the development roller with Experiment No. 65 is used, whereby the hardness of the surface layer 43 is lowered, but the flexibility thereof is increased, so that an improvement is roduced on the reduction in the formation of cracks in the surface layer 43 of the development roller with Experiment No. 61.

In the development roller with Experiment No. 62, in order to make the surface layer 43 thereof more flexible than that of the surface layer 43 of the development roller with Experiment No. 61, acryl polyol C having a decreased hydroxyl value is used, so that the development roller with Experiment No. 62 has less cracks in the surface layer 43 thereof than the development roller with Experiment No. 61 has, and high durability is secured.

In the development roller with Experiment No. 63, acryl polyol D is used, which has the same hydroxyl value as that of the acryl polyol C used in the development roller with Experiment No. 62, but has a lower glass transition temperature Tg than that of the acryl polyol C, so that in the development roller with Experiment No. 63, a more improvement is produced in the tolerance in the formation of cracks in the surface layer 43 than in the development roller with Experiment No. 62.

The above results indicate that the development roller comprising (1) an elastic layer and (2) a surface layer which is provided thereon and is made of a cross-linked material produced from (a) a polymer or a prepolymer having hydroxyl groups at a main chain or side chains thereof with a hydroxyl value of 100 or less, and (b) at least one component selected from the group consisting of guanamine, a guanamine derivative, and a guanamine-based condensation product, has a sufficient toner charging performance for use in practice, and accordingly is capable of preventing the occurrence of the fogging of the background of image in the images produced, and preventing the lowering of the image density and the formation of cracks in the surface layer of the development roller, with high durability being secured, even when used under high temperature and high humidity conditions and/or for an extended period of time. Furthermore, when a polymer or a prepolymer having a hydroxyl value of 100 or less and a glass transition temperature Tg of 60° or less, is used, the formation of cracks in the surface layer 43 can be securely prevented even for a more extended period of time.

Figure 3:
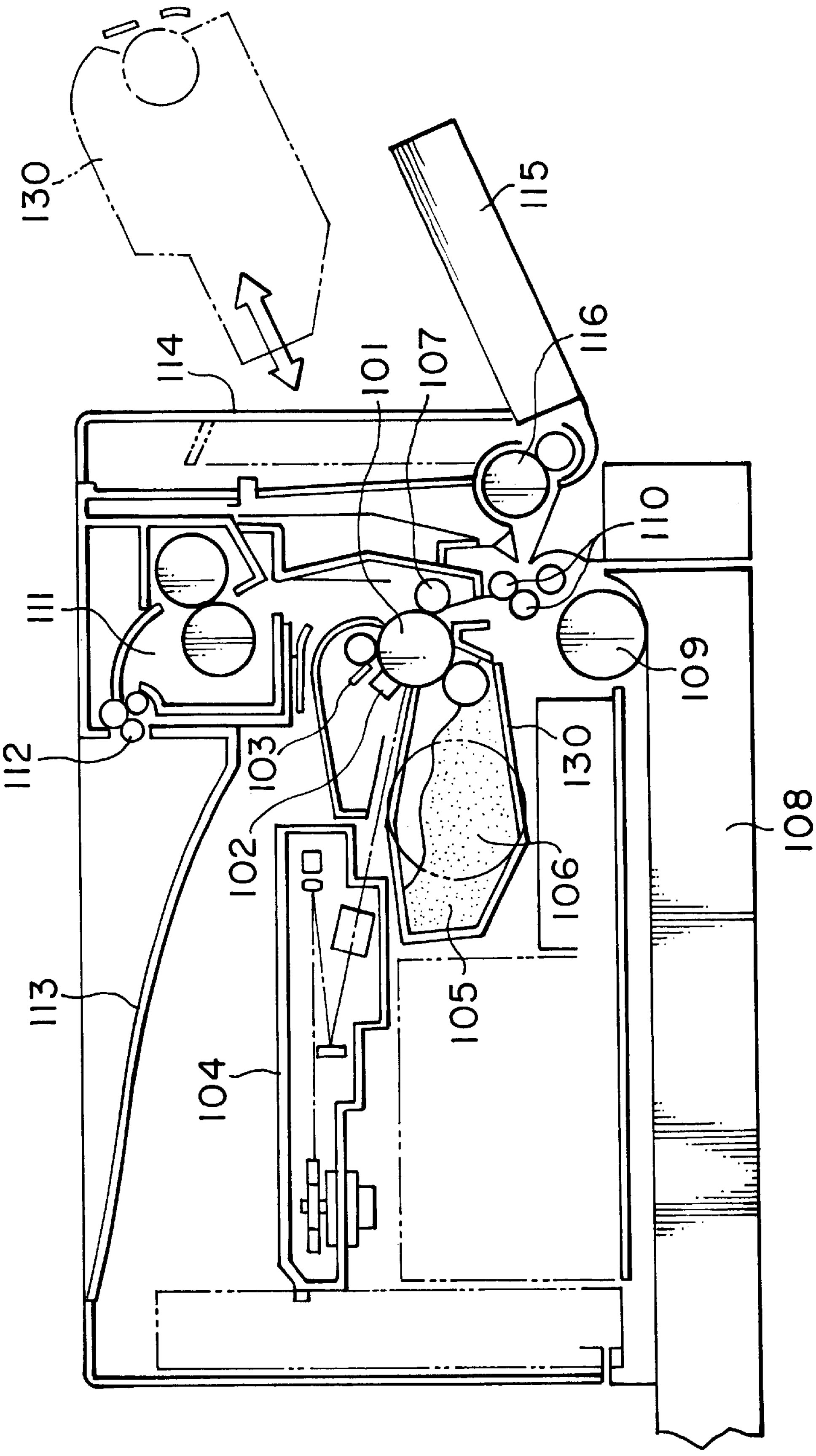
FIG. 3 is a schematic cross-sectional view of an image formation apparatus in general use.

The features of this invention will become apparent in the course of the following description of an exemplary embodiment with reference to FIG. 3, which is given for illustration of the invention and is not intended to be limiting thereof. More specifically, a latent image bearing member is described as a drum-shaped photoconductor, but it may be a belt-shaped photo-conductor, or a photoconductor in some other shape.

The development roller of the present invention has a stable durability for use in an extended period of time, so that it can be used not only as a single member, but also a detachable process unit including the development roller and a photoconductor as well.

With reference to FIG. 3, there is shown an image formation apparatus 100 including a detachable process unit 130. In the image formation apparatus 100, charging means 102, cleaning means 103, a laser optical system 104, development means 106 holding a toner 105 therein, and image transfer means 107 are situated around a photo-conductor 101 as illustrated in FIG. 3.

In the development means 106, there are disposed the toner tank 1, the stirrer roller 2, the toner supply roller 3, the development roller 4 and the development blade 6 as shown in FIG. 1, which are not shown in FIG. 3.

From the laser optical system 104, there is emitted onto the surface of the photoconductor 101 a laser beam which is converted into an optical signal from an original image so as to form an image on the surface of the photoconductor 101, which surface is uniformly charged by the charging means 102, whereby a latent electrostatic image corresponding to the original image is formed on the surface of the photoconductor 101.

The latent electrostatic image formed on the surface of the photoconductor 101 is then developed to a toner image with the toner 105 by the development means 106. The toner image is then transported to the image transfer means 107.

In a lower portion of the copying machine 100, there is disposed first transfer sheet supply means 108 in which image transfer sheets are held. The image transfer sheets are individually transported by an image transfer sheet supply roller 109 onto a register roller 110, and then transported to the image transfer means 107 in synchronism with the toner image formed one the photoconductor 101. The toner image is then transferred from the photoconductor 101 to the image transfer sheet by the image transfer means 107. The toner image bearing image transfer sheet is then transported to image fixing means 111, in which the toner image is thermally fused and fixed to the image transfer sheet while the image transfer sheet is caused to pass between a pair of heated image fixing rollers. The image transfer sheet to which the toner image has been fixed is then discharged through a pair of sheet discharge rollers 112 onto a sheet discharge tray 113, with an image bearing side of the image transfer sheet down.

On a front cover 114, there is detachably disposed second transfer sheet supply means 115 in which image transfer sheets are held in the same manner as in the first transfer sheet supply means 108, and from which image transfer sheets a top image transfer sheet is successively transported onto the register roller 110 through an image transfer sheet supply roller 116.

In the image formation apparatus 100, the photoconductor 101, the charging means 102, the cleaning means 103, and the development means 106 are united as a process unit 130, which is detachable from the image formation apparatus 100. More specifically, the process unit 130 is detachable, as indicated by the alternate long and two short dashes line, from the main body of the image formation apparatus 100 by opening the front cover 114. The process unit 130 may be designed in such a way that each member such as the development roller, the toner supply roller and the charging blade is disposed so as to be replaced.

Japanese Patent Application No. 10-235188 filed Aug. 21, 1998, Japanese Patent Application No. 11-007351 filed Jan. 14, 1999, Japanes Patent Application No. 11-081324 filed Mar. 25, 1999 and Japanese Patent Application No. 11-162764 filed Jun. 9, 1999 are hereby incorporated by reference.

What is claimed is:

1. A development roller for developing a latent electrostatic image to a visible toner image with toner, comprising an elastic layer and a surface layer provided on an outer peripheral surface of said elastic layer, said surface layer comprising a guanamine-skeleton-containing compound, wherein said elastic layer has a volume resistivity smaller than that of said surface layer.

2. The development roller as claimed in claim 1, wherein the guanamine skeleton of said guanamine-skeleton containing compound is derived from a compound selected from the group consisting of guanamine, a guanamine derivative and a guanamine-skeleton-containing condensation compound.

3. The development roller as claimed in claim 1, wherein the guanamine skeleton of said guanamine-skeleton containing compound is derived from a compound selected from the group consisting of guanamine, a guanamine derivative and a guanamine-skeleton-containing condensation compound.

4. The development roller as claimed in claim 1, wherein said guanamine-skeleton-containing compound is a condensation cross-linked compound prepared from (1) a polymer or a prepolymer having a plurality of hydroxyl groups in a main chain or a side chain or said polymer or said prepolymer, and (2) at least one compound selected from the group consisting of guanamine, a guanamine derivative, and a guanamine-skeleton-containing condensation compound.

5. The development roller as claimed in claim 1, wherein said guanamine-skeleton-containing compound is a condensation cross-linked compound prepared from a fluorine-contained polymer and at least one compound selected from the group consisting of guanamine, a guanamine derivative and a guanamine-skeleton-containing condensation compound.

6. The development roller as claimed in claim 2, wherein said guanamine derivative is benzoguanamine.

7. The development roller as claimed in claim 2, wherein said guanamine derivative is acetoguanamine.

8. The development roller as claimed in claim 1, wherein said elastic layer has a volume resistivity in a range of $10^4\Omega\cdot cm$ to $10^8\Omega\cdot cm$.

9. The development roller as claimed in claim 1, wherein said elastic layer comprises a polymer selected from the group consisting of polyurethane, ethylene·propylene·diene copolymer, natural rubber, butyl rubber, nitrile rubber, ethylene-propylene rubber, butadiene rubber, styrene rubber, isoprene rubber, silicone rubber, styrene-butadiene rubber, chloroprene rubber, acrylic rubber, urethane rubber, elastomers thereof, and mixtures thereof.

10. The development roller as claimed in claim 1, wherein said elastic layer comprises a cross-linked polymeric material.

11. The development roller as claimed in claim 1, wherein said surface layer comprises guanamine.

12. The development roller as claimed in claim 1, wherein said surface layer comprises a guanamine compound of formula 1:

(1)

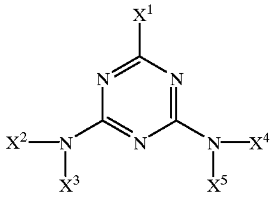

wherein $X^1$ is a hydrogen atom, an aliphatic hydrocarbon group or an aromatic hydrocarbon group and $X^2$, $X^3$, $X^4$ and $X^5$ are each independently a hydrogen atom, a lower alkanol group or an alkoxyalkyl group.

13. The development roller as claimed in claim 12, wherein $X^1$ is selected from the group consisting of methyl and phenyl, and $X^2$, $X^3$, $X^4$ and $X^5$ are each independently selected from the group consisting of methylol, butylol, methoxymethyl and butoxymethyl.

14. The development roller as claimed in claim 1, wherein said guanamine-skeleton-containing compound is present in said surface layer in an amount of 10 wt % or more based on the total weight of surface layer.

15. The development roller as claimed in claim 1, wherein said guanamine-skeleton-containing compound is present in said surface layer in 20 wt. % or more based on the total weight of surface layer.

16. The development roller as claimed in claim 9, wherein said guanamine-skeleton-containing compound is present in said surface layer in an amount of 10 wt % or more based on the total weight of surface layer.

17. The development roller as claimed in claim 9, wherein said surface layer comprises a guanamine compound of formula 1:

(1)

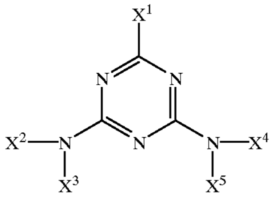

wherein $X^1$ is a hydrogen atom, an aliphatic hydrocarbon group or an aromatic hydrocarbon group and $X^2$, $X^3$, $X^4$ and $X^5$ are each independently a hydrogen atom, a lower alkanol group or an alkoxyalkyl group.

18. The development roller as claimed in claim 17, wherein said guanamine-skeleton-containing compound is present in said surface layer in an amount of 10 wt % or more based on the total weight of surface layer.

* * * * *

UNITED STATES PATENT AND TRADEMARK OFFICE
CERTIFICATE OF CORRECTION

PATENT NO. : 6,287,246 B1
DATED : September 11, 2001
INVENTOR(S) : Takayuki Yoshii et al.

It is certified that error appears in the above-identified patent and that said Letters Patent is hereby corrected as shown below:

Column 4,
Line 13, "and" should read -- an --.

Column 7,
Line 62, "pryolitic" should read -- pyrolitic --; and
Line 67, "polyethylene" should read -- polyacetylene --.

Column 10,
Line 59, "sekeleton" should read -- skeleton --.

Column 13,
Line 4, "power" should read -- powder --;
Line 47, "cores haft" should read -- core shaft --.

Column 32,
Line 57, "roduced" should read -- produced --.

Column 33,
Line 6, delete "a".

Column 34,
Line 40, "Jun." should read -- June --.

Signed and Sealed this

Nineteenth Day of March, 2002

Attest:

JAMES E. ROGAN
*Director of the United States Patent and Trademark Office*

*Attesting Officer*